INVENTOR.
ALFRED P. SPIVACK

NORMAL SINUS RHYTHM

VENTRICULAR FIBRILLATION

ASYSTOLE (ARREST)

ATRIAL FIBRILLATION

INVENTOR.
ALFRED P. SPIVACK

BY

ATTORNEYS

United States Patent Office 3,453,745
Patented July 8, 1969

3,453,745
APPARATUS FOR TRAINING IN THE ELECTRICAL TREATMENT OF CARDIAC DISORDERS
Alfred Paul Spivack, 791 Stanford Ave., Menlo Park, Calif. 94025
Filed Feb. 21, 1967, Ser. No. 617,651
Int. Cl. G09b 23/28
U.S. Cl. 35—17    9 Claims

ABSTRACT OF THE DISCLOSURE

An apparatus for training doctors and other medical personnel in the proper use of instruments, such as defibrillators, synchronized defibrillators and pacemakers, for treatment of cardiac disorders. The apparatus provides an electrical signal which simulates the electrical signals obtained by electrodes placed on the chest wall of a patient under normal and abnormal heart conditions. The electrical signals are presented to a simulated torso at the positions where the sensing of electrodes of the instruments are applied to a patient. The torso further includes terminals for receiving the equipment electrodes which provide the electrical shock for correcting the abnormal heart condition. The apparatus presents the simulated heart electrical signals in any selected order and advances from one simulated signal to another when proper electrical shock is applied for treatment of the cardiac disorder being simulated.

---

This invention relates to a training apparatus for instructing doctors and other medical personnel in the proper use of instruments such as defibrillators, synchronized defibrillators and pacemakers, for treating cardiac disorders.

As is known, there is now a widespread use of pacing and defibrillating equipment for the emergency treatment of cardiac disorders. The hospital personnel must be trained to ensure maximum usage and proper handling of such equipment. Under the present method of training, an animal is prepared and set up. This requires one or more physicians to prepare the animal. It necessitates sacrifice of the animal at the end of testing and training. Such methods of training, of course, cannot be carried out on a day to day basis because of the expense. Consequently, training is limited to a one-time basis for selected personnel, usually the doctors.

It is a general object of the present invention to provide an apparatus for practice, training and demonstration of the use of defibrillators, synchronized defibrillators and pacemaker instruments or apparatus.

It is another object of the present invention to provide an apparatus which can usefully be employed in simulating various heart rhythms and which changes the rhythms in response to proper externally applied shock.

It is another object of the present invention to provide means for generating electrical signals which correspond to the electrical signals which are generated by the heart under various heart conditions and present the generated signals at selected locations in a torso arranged to receive externally applied shock for treatment of the simulated condition and which serves to provide a new electrical signal responsive to the proper externally applied shock.

These and other objects of the invention will become more readily apparent from the following description and drawings.

In general, there is provided an apparatus and method for training, practicing and demonstrating the use of appartaus for the treatment of cardiac disorders. The apparatus selectively produces any one of several electrical signals which represent the signals which are generated by human heart activity under normal and abnormal conditions. For example, one signal may represent normal heart rhythm condition, whereas other signals may represent abnormal conditions such as ventricular fibrillation, asystole or atrial flutter. A selector cooperates with the means for generating the simulated signals to present selected electrical signals at predetermined locations on a simulated human torso. Conventional apparatus such as a defibrillator, synchronized defibrillator or pacemaker may then be suitably connected to the torso to receive the signals and an oscilloscope serves to display the signals. Upon observing an abnormal condition, the operator provides corrective shock to the simulated torso. When the proper shock for treatment of the condition being displayed is applied, the apparatus will advance to present another signal. For example, it may advance to show that the proper signal was applied and that the patient now has normal heart rhythm, or it may advance to one of the other conditions providing for further emergency treatment.

The foregoing is more particularly described in conjunction with the preferred embodiment as shown in the drawings, in which.

Figure 3:
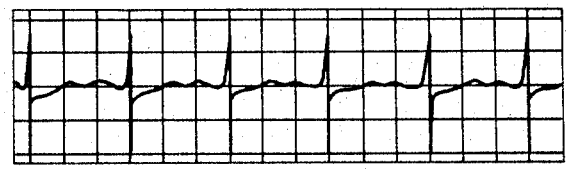
FIGURES 3-6 show typical electrical signals representing the electrical signals obtained from the chest wall during normal and abnormal heart rhythms.
Figure 4:
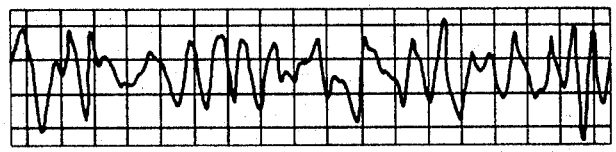

In the treatment of heart disorders, there are normally three abnormal conditions which are important. FIGURE 3 shows the electrical signals for normal sinus rhythm. FIGURE 4 shows ventricular fibrillation which is one of the more frequent emergency heart rhythms treated. This requires a non-synchronized shock to cause the heart to return to normal sinus rhythm. This is generally achieved by applying a shock of maximum voltage across the chest wall of an adult patient. The shock depolarizes the heart and allows it to revert to normal sinus rhythm.

Figure 5:
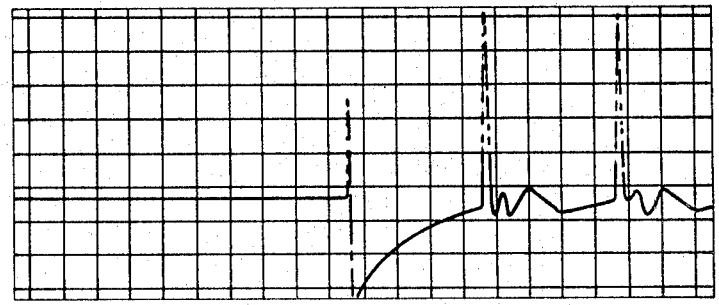
Figure 6:
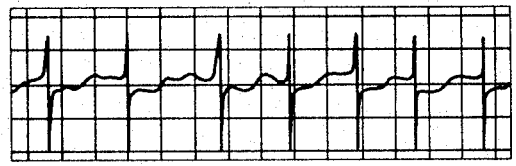

However, in certain instances, the application of such a depolarizing shock may cause the heart to go to another abnormal condition rather than returning to a normal sinus rhythm. For example, it may go to an asystole condition such as shown in FIGURE 5, or to an atrial fibrillation condition such as shown in FIGURE 6. Thus, the operator must be familiar with the treatment of these two conditions as well. If the heart is operating with atrial fibrillation, the operator must deliver a synchronized shock, the intensity requirement of which will be different with each patient. The shock must be applied at the proper moment in the depolarization of the heart to return the heart to its normal sinus rhythm. In the third condition which is asystole, the heart is completely stopped. Here, the operator is required to provide a pacing signal to the heart so that the stimulus will cause the heart to beat with sinus rhythm.

In the training apparatus the delivery of the various shocks described above should be in every way as close as possible to the real situation in order to make the training valid. The apparatus can then be set up in the hospital so each physician or nurse can have ample opportunity to go through practice and become familiar with the treatment apparatus or instruments so that at the time of an emergency, there is no time lost due to unfamiliarity with the electrical heart signals or treatment of the heart disorder evidenced by the electrical signals.

The signals shown in FIGURES 3, 4, 5 and 6 were obtained from patients having the particular conditions and recorded on a strip chart. In accordance with the present invention, such electrical signals are recorded on a magnetic tape or other storage means from which they can be selectively reproduced. By way of example, the signals may be recorded as adjacent tracks on a magnetic tape.

Figure 1:
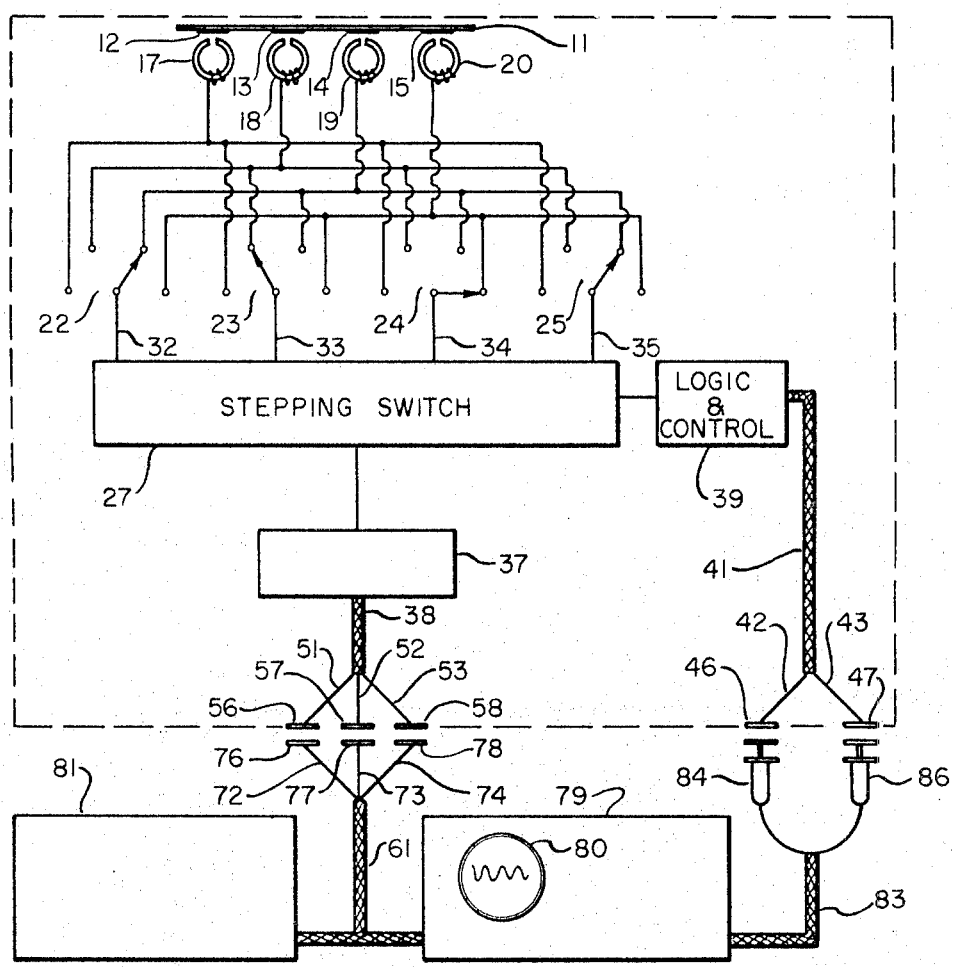
FIGURE 1 is a schematic representation of training apparatus according to the invention.

Referring to FIGURE 1, there is shown the end view of a magnetic tape 11 which includes four longitudinal tracks labelled 12, 13, 14 and 15. There is associated with each of the tracks a magnetic head or transducer labelled 17, 18, 19 and 20, respectively, to reproduce the recorded signals. The output line from each of the magnetic heads 17–20 is connected to one terminal of each of the switches 22–25. The wiper or common terminal of the switches 22–25 is connected to a stepping switch 27 by lines 32–35 respectively. The stepping switch 27 serves to individually connect one of the lines 32–35 to the signal processing circuits 37. By positioning the wipers, any head may be connected to each of the lines 32–35. Thus, any combination or sequence of heads is connected to the stepping switch 27. The signal processing circuits 37 serve to process the signals from the magnetic heads and provide output signals of suitable amplitude. For example, the recording may be an FM recording. In this case, the processing circuit might include a preamplifier, limiter, FM demodulator, and filter. FM recording and signal processing of this type are well known and are, therefore, not described in detail. The stepping switch 27 may comprise an electromechanical stepping switch which serves to selectively connect one of the lines 32–35 to the signal processing circuits 37. The switch may also be an electronic switch such as a shift register and gating circuits.

The stepping switch 27 is controlled by a logic and control switch 39 connected to the line 41. The operation of the switch 39 will be presently described. The input line 41 for the logic and control circuit includes first and second conductors 42 and 43 terminating at plates or electrodes 46 and 47. The output line 38 connected to the signal processing circuit 37 includes leads 51, 52 and 53 which terminate on plates or electrodes 56, 57 and 58, at which point the simulated electrical signals will appear.

Figure 2:
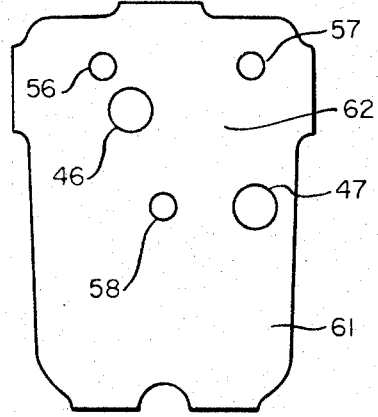
FIGURE 2 is an elevational view showing a simulated human torso according to the invention.

Referring particularly to FIGURE 2, the electrodes 56, 57 and 58 are provided on the surface of the simulated human torso 61 at locations which correspond generally to the location in which sensing electrodes of defibrillation, electrocardiograph, pacemaker and other apparatus are generally located to receive the electrical signals generated by the heart. The electrodes 46 and 47 are provided at the surface of the simulated torso at locations which correspond generally to the points at which shock is applied to a patient in treating a heart disorder.

Referring again to FIGURE 1, a multiple conductor cable 61 including leads 72, 73 and 74 having electrodes 76, 77 and 78 is associated with a defibrillator-pacemaker instrument 79. These electrodes are applied to the chest wall of the patient to monitor the electrical signal generated by the heart. In use of the apparatus of the present invention, the electrodes 76, 77 and 78 are placed on the electrodes 56, 57 and 58 to receive the reproduced heart signals from the recorder. An electrocardiograph 81 can also be connected to the electrodes to provide a permanent record. The defibrillator-pacemaker apparatus includes a cathode ray tube 80 which serves to display the electrical signals picked up from the patient. In the present instance, the signals are simulated signals obtained from electrodes 56, 57 and 58. The output of the defibrillation-pacemaker apparatus is applied to output electrodes 84 and 86 through cable 83. The electrodes are applied to the patient to provide appropriate shock to the heart for treatment of abnormal cardiac condition. In the present instance, the electrodes 84 and 86 are shown applied to the sensing electrodes 46 and 47 of the training apparatus of the present invention.

The logic and control circuit 39 controls the stepping switch 27 responsive to the signals applied to the electrodes 46 and 47. The logic and control circuit includes conventional type logic circuits which serve to step the switch forward or backwards in response to correct or incorrect treatment for the condition which is reproduced and presented at the electrodes 56, 57 and 58. The circuits may include amplitude detecting circuits whereby the stepping switch is advanced only in response to signals having the appropriate amplitude, timing, duration, etc., for the treatment of the simulated condition. Thus, the logic and control circuit serves to discriminate against proper and improper treatment and to cause the stepping switch to respond accordingly.

By way of example, the following procedure could be followed during a training cycle. The first simulated signal would be the normal sinus ryhthm, FIGURE 3. This would be achieved by connecting magnetic head 17 associated with the normal channel 12 to signal processor 37 which would present a normal electrical signal to electrodes 56, 57 and 58. After a predetermined period, three minutes, for example, the logic and control circuit 39 would cause the stepping switch to advance to the second position. In all other program positions, proper external stimulus would be required at the electrodes 84 and 86 to activate the stepping switch. For example, the second position might connect the magnetic head associated with the ventricular fibrillation recording to the processor and electrodes. The shock required to cure this disorder is of such magnitude as to completely depolarize the heart. Thus, if upon observing a ventricular fibrillation signal on the scope 80, the operator does not apply the proper shock from the defibrillator 79, the logic and control circuit will not advance the stepping switch and the condition will continue to be displayed. Only after the proper signal is applied will the stepping switch advance and then it will advance to one of the conditions preselected by the manual setting of the switches. For example, if the signal being displayed is the asystole signal, FIGURE 5, an external pacing stimulus greater than a predetermined amplitude must be applied. The logic and control circuit will not advance the sequence until the proper signal is applied. If the external pacing is discontinued before a predetermined time, say, three minutes after its initiation, the sequence may revert back to the asystole condition. If the pacing stimulus is continued for more than three minutes, the sequence will automatically advance to the normal, connecting the head 17 to the signal processor.

The pacing stimulus may be applied through the defibrillating electrodes or, optionally, through a smaller additional set of electrodes mounted on the dummy. When atrial flutter is displayed, a single synchronized defibrillation pulse greater than a predetermined amplitude must be applied in order for the simulator sequence to advance. If the defibrillator pulse is not synchronized, the stepping switch will connect the head associated with the ventricular defibrillation recording to the signal processor. Only after the correct treatment signals are applied does the apparatus advance to the next condition and finally to the normal condition.

Thus, there has been provided a training apparatus which serves to present electrical signals to a simulated torso which corresponds to those signals which would be obtained for the chest cavity for various conditions of heart operation. The training device is responsive to applied stimulus or shock to return to normal or to other selected conditions as would occur in treating a heart patient. When appropriate treatment has been performed, the apparatus will then revert to and display normal heart rhythm.

I claim:

1. A training apparatus for training medical personnel in the use of electrical equipment for the treatment of abnormal cardiac activity comprising a simulated human torso, means for providing electrical signals representative of the electrical signals developed by the heart of a patient under normal and abnormal heart conditions, one or more output electrodes located at predetermined locations on the chest wall of said torso corresponding to the location at which cardiac signals are normally sensed on a human patient, and means for selectively applying one of said signals to said output electrodes to provide at said electrodes said selected electrical signal whereby the electrical equipment may be applied thereto to sense the signals and provide corresponding indications to the personnel.

2. A training apparatus for training medical personnel in the use of electrical equipment for the treatment of abnormal cardiac activity comprising means for providing electrical signals representative of the electrical signals developed by the heart of a patient under normal and abnormal heart conditions, one or more output electrodes, means for selectively applying one of said signals to said output electrodes to provide at said electrodes said selected electrical signal whereby the electrical equipment may be applied thereto to sense the signals and provide corresponding indications to the personnel, and input electrodes adapted to receive from the electrical treatment equipment the electrical stimulus normally applied to a patient to correct abnormal heart signals sensed at the output electrodes and indicated to the personnel.

3. A training apparatus as in claim 2 wherein said selecting means comprises a plurality of switch means each adapted to receive said electrical signals and provide a selected one of said signals at its output, and means selectively connecting the output from the switch means to said electrodes responsive to stimulus applied to the input electrodes.

4. A training apparatus as in claim 3 including a simulated human torso, said output and input electrodes being located at predetermined locations thereon corresponding to locations at which cardiac signals are normally sensed and treatment stimulus applied thereto.

5. A training apparatus for training medical personnel in the use of electrical equipment for the treatment of abnormal cardiac activity comprising means for storing electrical signals representative of the electrical signals developed by the heart of a patient under normal and abnormal heart conditions on a plurality of parallel record tracks on a magnetic recording medium, means for simultaneously reproducing said signals, one or more output electrodes, and means for selectively applying one of said reproduced signals to said output electrodes to provide at said electrodes said selected electrical signal whereby the electrical equipment may be applied thereto to sense the signals and provide corresponding indications to the personnel.

6. A training apparatus as in claim 3 wherein said signals are stored as a plurality of parallel record tracks on a magnetic recording medium and means are provided for simultaneously reproducing said signals and applying the same to said switch means.

7. A training apparatus for training medical personnel in the use of electrical equipment for treatment of abnormal cardiac activity comprising a magnetic storage medium adapted to have recorded thereon a plurality of signals, manifesting the signals which are obtained from a patient under normal and abnormal heart conditions, simultaneously reproducing said signals, switch means connected to said reproducing means each adapted to receive all of said signals and provide a selected one of said signals at its output, signal processing means, means for selectively connecting the output of said switch means to said processing means, one or more electrodes connected to receive the signals from the processing means, a simulated human torso adapted to receive said electrodes at positions which correspond to the positions at which cardiac electrical signals are sensed on a human patient, input electrodes mounted on said human torso at positions corresponding to the positions at which stimulus is applied to a human patient to correct abnormal heart conditions and adapted to receive electrical stimulus from said electrical equipment, and means responsive to said electrical stimulus for conditioning said selecting means whereby to select another of said signals responsive to applied stimulus.

8. Apparatus as in claim 7 wherein said last named means comprises a logic and control circuit responsive to predetermined stimulus under various cardiac conditions for advancing said selecting means.

9. Training apparatus for training medical personnel in the use of electrical equipment for treating abnormal cardiac activity comprising means for producing electrical signals manifesting human heart activity, said electrical signals representing typical normal and abnormal predetermined heart conditions, one or more output electrodes, selector means cooperating with said first means and serving to selectively couple one of said signals to said one or more output electrodes to provide at said electrodes a selected one of said electrical signals, one or more input electrodes, said selector means being responsive to stimulus for proper treatment of the heart condition manifested by the signal received and applied to said one or more input electrodes to select another one of said signals for coupling to said output electrodes.

References Cited

UNITED STATES PATENTS 3,267,933    8/1966    Mills et al. _____ 128—2.06

OTHER REFERENCES

Roy: "An Electronic Heartbeat Simulator and a Cardiac Tachometer," IRE Transactions on Medical Electronics, July 1958, pp. 48–52.

EUGENE R. CAPOZIO, *Primary Examiner.*

H. S. SKOGQUIST, *Assistant Examiner.*

U.S. Cl. X.R.

128—2.06, 419.